(12) United States Patent
Hitomi et al.

(10) Patent No.: US 6,275,271 B1
(45) Date of Patent: Aug. 14, 2001

(54) TONE DISPLAY METHOD

(75) Inventors: Hisakazu Hitomi, Okayama; Hideki Ohmae, Sanda, both of (JP); Adam J. Kunzman, Fairview, TX (US)

(73) Assignees: Matsushita Electric Industrial Co. Ltd., Osaka (JP); Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/518,649

(22) Filed: Mar. 3, 2000

Related U.S. Application Data

(60) Provisional application No. 60/122,838, filed on Mar. 4, 1999.

(51) Int. Cl.[7] .................................................. H04N 9/12
(52) U.S. Cl. .......................... 348/743; 348/742; 348/771
(58) Field of Search ................................... 348/742, 743, 348/771

(56) References Cited

U.S. PATENT DOCUMENTS

| 5,448,314 | 9/1995 | Heimbuch et al. | 348/743 |
|---|---|---|---|
| 5,619,228 | 4/1997 | Doherty | 345/148 |
| 5,706,061 | * 1/1998 | Marshall et al. | 348/743 |
| 5,984,478 | * 11/1999 | Doany et al. | 348/743 |
| 5,986,721 | * 11/1999 | Jones, Jr. et al. | 348/743 |
| 6,108,053 | * 8/2000 | Pettitt et al. | 348/743 |
| 6,155,687 | * 12/2000 | Peterson | 348/743 |

FOREIGN PATENT DOCUMENTS 9-34399    9/1997  (JP) .

* cited by examiner

Primary Examiner—Reinhard J. Eisenzopf
Assistant Examiner—Trang U. Tran
(74) Attorney, Agent, or Firm—Charles A. Brill; Wade James Brady, III; Frederick J. Telecky, Jr.

(57) ABSTRACT

A tone display method is provided that can prevent image quality deterioration of the dynamic image and can avoid a cost increase. When an image with 256 tones is displayed, one field is divided into 37 subfields for one color. Among the 8 bits corresponding to the 256 tones, the six high-order bits from the third bit are displayed by means of time width modulation using 35 subfields SF3–SF37 having weights of "'4" and "8". The two low-order bits are displayed on a binary base using two subfields SF1 and SF2 whose weights are "'1" and "2", respectively.

18 Claims, 6 Drawing Sheets

| SUBFIELD NO. | | 1 | 2 | 3 | 4 | 5 | 6 |
|---|---|---|---|---|---|---|---|
| | WEIGHT | 1 | 2 | 4 | 8 | 13 | 14 |
| TONE | 0 | 0 | 0 | 0 | 0 | 0 | 0 |
| | 1 | 1 | 0 | 0 | 0 | 0 | 0 |
| | 2 | 0 | 1 | 0 | 0 | 0 | 0 |
| | 3 | 1 | 1 | 0 | 0 | 0 | 0 |
| | 4 | 0 | 0 | 1 | 0 | 0 | 0 |
| | 5 | 1 | 0 | 1 | 0 | 0 | 0 |
| | 6 | 0 | 1 | 1 | 0 | 0 | 0 |
| | 7 | 1 | 1 | 1 | 0 | 0 | 0 |
| | 8-15 | (IDENTICAL TO 0-7) | | | 1 | 0 | 0 |
| | 16-28 | (IDENTICAL TO 3-15) | | | | 1 | 0 |
| | 29-42 | (IDENTICAL TO 15-28) | | | | | 1 |

FIG. 4a

| SUBFIELD NO. | | 19 | 20 | 21 | 22 | 23 | 24 |
|---|---|---|---|---|---|---|---|
| | WEIGHT | 1 | 2 | 4 | 8 | 14 | 14 |
| TONE | 0 | 0 | 0 | 0 | 0 | 0 | 0 |
| | 1 | 1 | 0 | 0 | 0 | 0 | 0 |
| | 2 | 0 | 1 | 0 | 0 | 0 | 0 |
| | 3 | 1 | 1 | 0 | 0 | 0 | 0 |
| | 4 | 0 | 0 | 1 | 0 | 0 | 0 |
| | 5 | 1 | 0 | 1 | 0 | 0 | 0 |
| | 6 | 0 | 1 | 1 | 0 | 0 | 0 |
| | 7 | 1 | 1 | 1 | 0 | 0 | 0 |
| | 8-15 | (IDENTICAL TO 0-7) | | | 1 | 0 | 0 |
| | 16-29 | (IDENTICAL TO 2-15) | | | | 1 | 0 |
| | 30-43 | (IDENTICAL TO 16-29) | | | | | 1 |

FIG. 4b

| SUBFIELD NO. | | 1 | 2 | 3 | 4 | 5 | 6 |
|---|---|---|---|---|---|---|---|
| | WEIGHT | 1 | 2 | 4 | 6 | 11 | 18 |
| TONE | 0 | 0 | 0 | 0 | 0 | 0 | 0 |
| | 1 | 1 | 0 | 0 | 0 | 0 | 0 |
| | 2 | 0 | 1 | 0 | 0 | 0 | 0 |
| | 3 | 1 | 1 | 0 | 0 | 0 | 0 |
| | 4 | 0 | 0 | 1 | 0 | 0 | 0 |
| | 5 | 1 | 0 | 1 | 0 | 0 | 0 |
| | 6 | 0 | 1 | 1 | 0 | 0 | 0 |
| | 7 | 1 | 1 | 1 | 0 | 0 | 0 |
| | 8-13 | (IDENTICAL TO 2-7) | | | 1 | 0 | 0 |
| | 14-24 | (IDENTICAL TO 3-13) | | | | 1 | 0 |
| | 25-42 | (IDENTICAL TO 7-24) | | | | | 1 |

*FIG. 6a*

| SUBFIELD NO. | | 19 | 20 | 21 | 22 | 23 | 24 |
|---|---|---|---|---|---|---|---|
| | WEIGHT | 1 | 2 | 4 | 6 | 11 | 19 |
| TONE | 0 | 0 | 0 | 0 | 0 | 0 | 0 |
| | 1 | 1 | 0 | 0 | 0 | 0 | 0 |
| | 2 | 0 | 1 | 0 | 0 | 0 | 0 |
| | 3 | 1 | 1 | 0 | 0 | 0 | 0 |
| | 4 | 0 | 0 | 1 | 0 | 0 | 0 |
| | 5 | 1 | 0 | 1 | 0 | 0 | 0 |
| | 6 | 0 | 1 | 1 | 0 | 0 | 0 |
| | 7 | 1 | 1 | 1 | 0 | 0 | 0 |
| | 8-13 | (IDENTICAL TO 2-7) | | | 1 | 0 | 0 |
| | 14-24 | (IDENTICAL TO 3-13) | | | | 1 | 0 |
| | 25-43 | (IDENTICAL TO 7-25) | | | | | 1 |

*FIG. 6b*

TONE DISPLAY METHOD

CROSS REFERENCE TO PRIOR APPLICATIONS

This application claims priority under 35 U.S.C. 119 based upon provisional application Serial No. 60/122,838, filed Mar. 4, 1999, the contents of which are incorporated herein by reference.

BACKGROUND OF THE INVENTION

1. Field of the Invention

This invention relates to a tone display method that overlaps and displays multiple subfields obtained by weighting dynamic images having tones in the time domain in a DLP (digital light processing) image display device using one reflection-type device or other image display device that displays color images by the time-division output of color signals.

2. Brief Description of the Prior Art

In an image display device using the digital display method, such as a veneer DLP image display device using one reflection-type device, a method such as disclosed in U.S. Pat. No. 5,448,314 can be used to display color signals.

FIG. 7 shows an example of the configuration of an image display device. FIG. 8 shows an example of the configuration of the color wheel (2) shown in FIG. 7. Color wheel (2) consists of color filters of green G, red R and blue B with each central angle set at 60°. In order to reduce color separation, the color wheel can be set to have, for example, three rotations for one field.

In FIG. 7, 8-bit digital color signals of RGB are input to time division multiplex circuit (5). Each of the input color signals of RGB is time-.base compressed to the ⅓ period, time-division multiplexed, and output. FIG. 9 shows the pattern obtained by time-division multiplexing the period of one field. A DMD (digital micromirror device) (3) is controlled by the output signal. Also, the white light emitted from lamp (1) used as the light source reaches the DMD (3) after passing through color wheel (2) used as the color extraction device. In this case, the light of colors G, R, B, corresponding to the periods shown in FIG. 9 and obtained after the white light is transmitted through the color wheel (2) and reaches DMD (3). In FIG. 9, the periods divided corresponding to the colors G, R, B are referred to as segments. In the following explanation and figures, the segments corresponding to colors G, R, B are represented by s, which means segment, and a number counted from the head or start of one field. In this case, color wheel (2) rotates clockwise with the light emitted from lamp (1) set at the position of 0° (12 o'clock). The light in colors G, R, B is reflected by DMD (3) controlled by the corresponding periods and signals of G, R, B. The output optical signals of G, R, B are irradiated sequentially on screen (4) and are sensed as color images.

Each segment of the signals of G, R, B consists of multiple time-base divided subfields used for tone display. As an example of the subfield period, the subfield configuration of the first segment of G in the case of displaying 8 bits, that is 256 tones, is shown in the low-order portion of FIG. 9. FIG. 10 shows the subfield configurations of the other segments of G. FIG. 10 only shows the case of G. However, the patterns are the same for R and B. Reference is made to the tone display method disclosed in Japanese patent application to Kokai, No. Hei 9 [1997]-34399, etc., for the subfield configuration disclosed in this example.

In FIG. 10, the portion encircled by a rectangle is a subfield, and the length of the rectangle is the subfield period (time length of the subfield). In the following explanation and figures, the nth subfield is represented by SFn. The time length of each subfield is defined as the weight corresponding to the brightness of one color when only the segment concerned is turned on. In the case of the configuration shown in FIG. 7, the weight corresponds to the time when the mirror of DMD is on (lit) or to the number of lighting pulses during the time length. In the following figures, the value of the weight will be displayed below the rectangle that represents each subfield.

The process of selecting the appropriate subfield to be turned on (to be lit up) corresponding to the tone to be displayed will now be explained.

In a conventional example, one field is divided into 34 subfields for one color. Among the 8 bits, the 5 high-order bits are displayed by continuous time-width modulation using 31 subfields, that is, subfields SF4–SF34 having a weight of "8". The 3 low-order bits are displayed on the binary base using 3 subfelds SF1–SF3 having weights of "1", "2" and "4", respectively. In other words, for the subfields used to display the 5 high-order bits, whenever the tone is increased by 8, that is, whenever the 5 high-order bits have a carry of one, the number of lit subfields is increased one at a time in the sequence from SF4–SF34. Each pixel can display the tones by lighting up the subfields as described above. Since the line of vision is almost fixed on a stationary image, the image quality will not deteriorate by adding subfields for each pixel.

In the aforementioned conventional tone display method using subfields, pseudocontour noise is observed for dynamic images which deteriorates the image quality. Occurrence of pseudocontour of dynamic images is described in the reference ("Studies on Improving Dynamic Image Quality of PDP in Subfield Display" (Japanese Title), which is synonymous with "Consideration on Improving Motion Picture Quality of PDP with use of a Sub-Field Method" (English Title), IEICEJ Technical Report, EID 97-54 (1997-10), pp. 43-48). Since the line of vision moves following the track of a dynamic image, pseudocontour occurs because the position where the eyes process time integration changes in the space following the movement of the line of vision. In other words, when the line of vision moves at a speed to cover multiple pixels during the display period of one field, subfields are added not only in one pixel but over multiple pixels. As a result, the original image cannot be obtained, and the image quality is deteriorated.

FIG. 12 is a diagram explaining a tone display method, which displays 256 tones using n subfields. In this case, the aforementioned problem becomes extremely serious. Pixels A and B are arranged adjacent to each other. Pixel A displays 127 tones with subfields SF1-SFm (m=n/2) turned on and subfields SF (m+1)-SFn turned off. Pixel B displays 128 tones with subfields SF1-SFM turned off and subfields SF (m+1)-SFn turned on. In FIG. 12, the pixels are arranged in the vertical direction, while the subfields are arranged in the horizontal direction. In other words, the vertical direction in FIG. 12 indicates the spatial movement of the vision spot, while the horizontal direction indicates the time movement of the vision spot. In this case, when the vision spot does not move from pixel A (arrow c), the integral value of one field of pixel A becomes 127 tones as displayed. However, when the vision spot moves from pixel A to pixel B at a speed of 2 pixels per field (arrow a), both of the integral values of pixels A and B become 255 tones. When the vision spot moves from pixel B to pixel A at a speed of 2 pixels per field (arrow b), both of the integral values of pixels A and B become 0 tone.

In order to measure the actual image quality deterioration in a quantitative manner, FIG. 11 shows a computer-simulated image observed when a moving lamp waveform is displayed using the tone display method with the subfield configuration shown in FIG. 10. The basic method of the simulation is described in the above-mentioned reference. In this example, subfields are divided into 6 segments. Each unit period of each subfield is appropriately set corresponding to the position in accordance with the aforementioned division in one field. In this simulation, the time integral level of the eyes is calculated when the vision spot moves to the right at a speed of 8 pixels during the display period of each field. In this case, the simulation results are for G. However, the same results can be obtained for R and B. In the following, the case of G will be explained as an example.

For the lamp waveform used in this case, the level (tone) moves up by one corresponding to a movement of one pixel to the right in the horizontal direction. Levels 0–255 correspond to the horizontal positions 0–255, respectively.

When the lamp waveform is input, the waveform observed by the eyes should be a straight oblique line. However, the waveform becomes that shown in FIG. 11 when the conventional tone display method with the subfield configuration shown in FIG. 10 is used. The main reason for such a problem is that relatively strong noise occurs at the positions where the tone is a multiple of 8, that is, at the positions where the subfields with a weight of 8 are freshly lit up. More specifically, relatively strong noise corresponding to eight levels is generated near the positions where the tone to be displayed changes from 8×n−1 to 8×n (n is an integer in the range of 1–31).

The reason for the aforementioned noise will be explained based on the case in which the tone to be displayed is increased by one from 39 to 40. When the tone to be displayed is 39, all of the subfields of Gs1 are turned on. When the tone is changed to 40, SF1–SF3 of Gs1 are turned off, and SF8 of Gs2 is turned on. The on/off switching of the subfields is performed across the segments. Also, the total weight of the subfields switched to the off state in Gs1 is "7", while the total weight of the subfields switched to the on state in Gs2 is "8". When on/off switching of the subfields is performed across the segments, the movement interval (period) is usually expanded. As a result, the moving range of the vision line is expanded, and noise tends to occur. In particular, when the subfields as the objects of the on/off switching have a large total weight, the noise becomes more significant. On the other hand, if on/off switching of the subfields is not performed across the segments, the movement interval (period) becomes narrow for a change within a segment. As a result, the moving range of the vision line is reduced, and the chance for the occurrence of noise is reduced. For example, when the tone to be displayed is in the range of 0–39, that is, when only the subfields in Gs1 are used, little noise occurs even when SF1–SF3 are changed to any of SF4–SF7. As shown in FIG. 11, almost no noise occurs in the portion corresponding to the tone range of 0–39.

In the aforementioned conventional tone display method using subfields, when a picture is observed following the movement of the image, a significant brightness difference occurs between the pixels that originally have little difference in brightness, leading to an unnatural feel. Consequently, pseudocontour image-quality deterioration results for an image of the human body or other image that changes gradually.

In order to solve the aforementioned problems in the conventional tone display method using subfields, the subfields are divided in a finer manner, and the weight of each subfield is reduced to a level close to the minimum weight ("1" in the tone display method shown in FIGS. 9 and 10). However, more subfields result in an increase in the memory capacity and, therefore, an increase in power consumption. When the subfields are divided on a very small scale, the cost will be increased significantly. Consequently, it is desired to develop a tone display method that can prevent the image quality deterioration of dynamic images and can avoid an increase in cost by preventing the increase in the number of subfields to the extent possible.

SUMMARY OF THE INVENTION

The purpose of this invention is to solve the aforementioned problems of the conventional methods by providing a tone display method that can prevent image quality deterioration of dynamic images and can avoid an increase in cost.

In order to realize the aforementioned objective, a feature of this invention is to provide a tone display method characterized by the following facts: a time band corresponding to a prescribed color in one frame/field consists of multiple time-division time bands; a timing segment is set corresponding to each of the aforementioned time-division time bands; each of the aforementioned segments consists of multiple subfields; the tone of the aforementioned one prescribed color is displayed by appropriately turning on/off each of the aforementioned subfields of the aforementioned one prescribed color; each of the aforementioned subfields has a weight corresponding to the brightness of the aforementioned one prescribed color obtained when only the subfield concerned is turned on, with one unit being defined as the result obtained by dividing the brightness, obtained when all of the aforementioned subfields corresponding to the aforementioned one prescribed color in the aforementioned one frame/field are turned on, by the number of tones; some of the aforementioned subfields are low-order subfields whose weights are smaller than the weight corresponding to a prescribed tonal width; at least one of the aforementioned segments has the aforementioned low-order subfields, each of the aforementioned segments has at least one medium subfield, which is a subfield other than the aforementioned low-order subfields and has a weight corresponding to the aforementioned tonal width, and at least one high-order subfield that is a subfield other than the aforementioned loworder subfields and has a weight larger than the weight corresponding to the aforementioned prescribed tonal width; the subfields of each segment should be configured appropriately so that every possible weight, which is a multiple of the weight of the aforementioned medium subfield and is smaller than the total weight of the segment concerned, can be realized by the combination of the weights of the aforementioned subfields; when the tone display is switched consecutively, the on/off switching of the aforementioned subfields is performed in the sequence of low-order subfield, medium subfield and high-order subfield; the on/off switching of the aforementioned low-order subfields is performed sequentially with the subfield having a smaller weight being switched first; as far as on/off switching of the aforementioned high-order subfields is concerned, the on/off switching of the high-order subfields in the same segment is performed first; when the on/off switching of the subfields in the same segment is not sufficient, the subfields in another segment are selected according to the timing arrangement of the aforementioned segment; followed by on/off switching of the selected subfields.

According to a second feature of this invention, the tone display method described in accordance with the first feature of this invention is characterized by the fact that when 256 tones are displayed, the aforementioned prescribed tonal width is defined as 4 tones.

According to a third feature of this invention, the tone display method described in accordance with the first and second features of this invention is characterized by the fact that there is one segment having the aforementioned low-order subfields.

According to a fourth feature of this invention, the tone display method described in accordance with the first and second features of this invention is characterized by the fact that all of the aforementioned segments have the same configuration of the aforementioned low-order subfields.

According to a fifth feature of this invention, the tone display method described in any of the first to fourth features of this invention is characterized by the following facts: each of the segments having low-order subfields has n (n is a prescribed natural number) low-order subfields; each of the aforementioned n low-order subfields has a weight that is $2^0$, $2^1$, ..., or $2^{n-1}$ times the aforementioned unit; and the aforementioned medium subfield has a weight that is $2_n$ times the aforementioned unit.

According to a sixth feature of this invention, the tone display method described in accordance with the fifth feature of this invention is characterized by the fact that each of some or all of the high-order subfields in each of the aforementioned segments has a weight that is $2^{n+1}$, $2^{n+2}$, ..., $2^{n+m}$ (m is a prescribed natural number) times the aforementioned unit, and the rest of the high-order subfields in each of the aforementioned segments have weights that are more than $2^{n+m}$ times the aforementioned unit.

According to a seventh feature of this invention, the tone display method described in accordance with the sixth feature of this invention is characterized by the fact that the time length difference among the rest of the high-order subfields in each of the aforementioned segments is 0 or 1.

According to an eighth feature of this invention, the tone display method described in accordance with the fifth feature of this invention is characterized by the fact that each of the aforementioned segments has two or more high-order subfields, with the aforementioned two or more high-order subfields having different weights.

According to a ninth feature of this invention, the tone display method described in any of the first to eighth features of this invention is characterized by the fact that the weight difference among all of the segments or the weight difference among all of the segments having no low-order subfield is 0 or 1 times the aforementioned unit. According to a tenth feature of this invention, the tone display method described in any of the first to ninth features of this invention is characterized by the fact that the weight is the time length, with one unit being defined as the time obtained by dividing the time corresponding to the aforementioned one prescribed color, in the aforementioned one frame/field, by the number of tones.

As described above, when the tone to be displayed is changed, the degree of change in position and quantity during the lighting period accompanied by the change in the subfields turned on in each segment is reduced. In this way, the pseudocontour of the dynamic image can be reduced, and the image quality can be improved. Also, an increase in the cost can be avoided using the aforementioned configuration.

BRIEF DESCRIPTION OF THE DRAWINGS

FIG. 4 is a diagram illustrating the subfield selection tables of the tone display method disclosed in the second embodiment of this invention.

FIG. 6 is a diagram illustrating the subfield selection tables of the tone display method disclosed in the third embodiment of this invention.

DESCRIPTION OF THE PREFERRED EMBODIMENTS

In the following, the embodiments of this invention will be explained with reference to the drawings.

In accordance with the first embodiment of the invention, the tone display method disclosed in the present embodiment is used to display 8-bit images with 256 tones.

Figure 1:
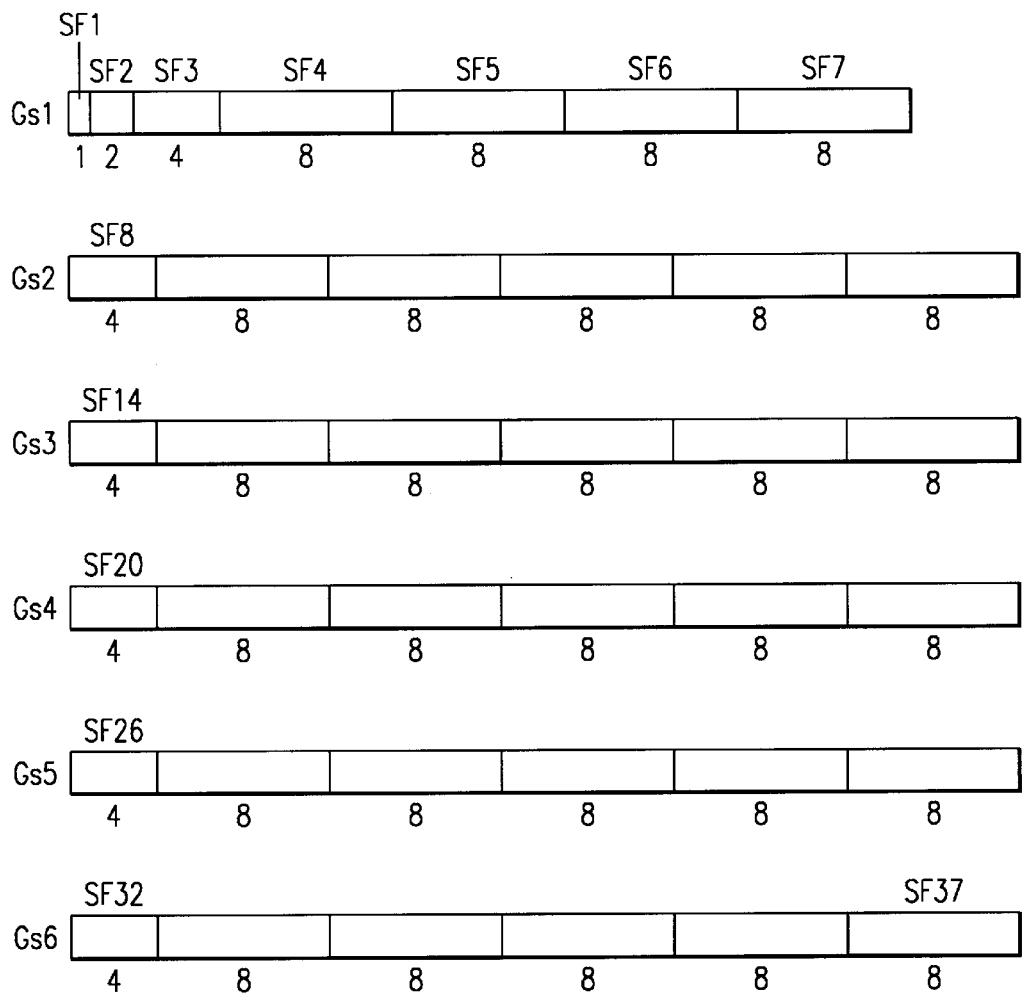
FIG. 1 is a diagram illustrating the subfield configuration adopted in the tone display method disclosed in the first embodiment of this invention.
Figure 7:
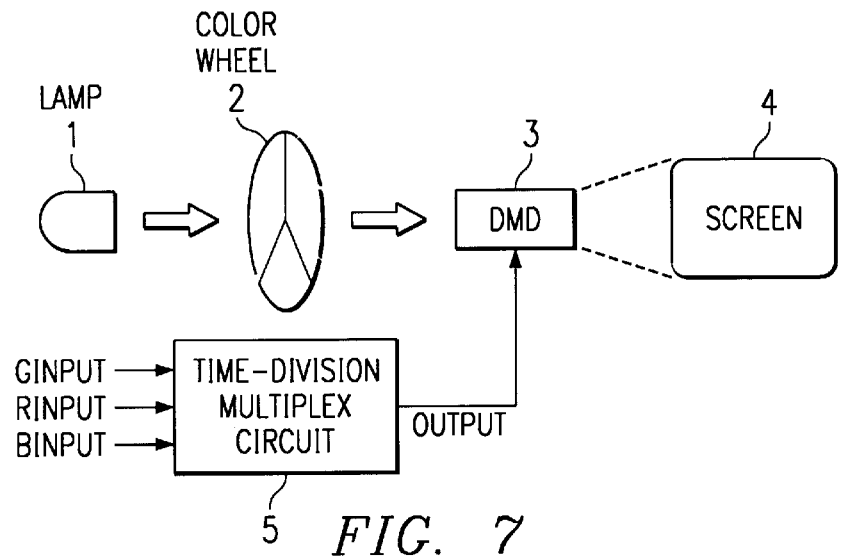
FIG. 7 is a block diagram illustrating an image display device for realizing the tone display method using subfields.
Figure 8:
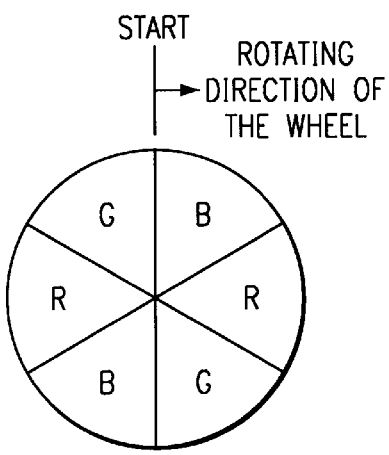
FIG. 8 is a diagram illustrating an example of the color filter used in the image display device shown in FIG. 7.
Figure 9:
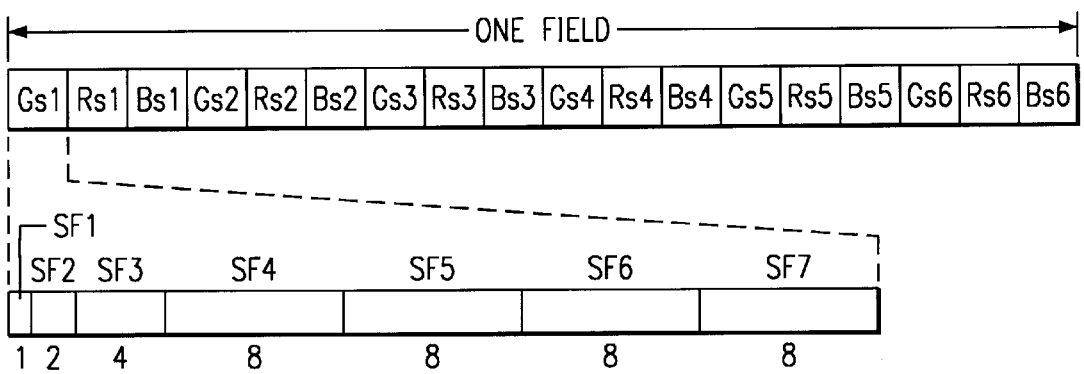
FIG. 9 is a diagram illustrating the segments in one field in the conventional toner display method.

FIG. 1 is a diagram illustrating the subfield configuration adopted in the tone display method disclosed in the first embodiment. Although the subfield configuration shown in this figure is for the color G, it is also applicable to R and B. In the present embodiment, the image display device used for realizing the tone display method is identical to the conventional example shown in FIG. 7. The configuration of the color wheel is identical to the conventional example shown in FIG. 8. The arrangement of the segments in one field is identical to the conventional example shown in FIG. 9.

In the present embodiment, one field is divided into 37 subfields for one color. Among the 8 bits corresponding to the 256 tones, the 6 high-order bits since the third bit are displayed by time-width modulation using 35 subfields, that is, SF3–SF37 having weights of "4" and "8". The two low-order bits are displayed on the binary base using two subfields, that is, SF1 and SF2 having weights of "1" and "2", respectively. In the present embodiment, the "weight" is measured by the time length of each subfield. For the time length of each subfield, one unit is defined as the result obtained by dividing the time corresponding to one color in one frame by 256, the number of tones. The weight of each subfield is defined corresponding to the brightness of one color when only the subfield concerned is turned on. In the case of the configuration shown in FIG. 7, the weight corresponds to the time at which the mirror of the DMD is on (lit) or to the number of lighting pulses during the time length. SF1 and SF2 correspond to the "low-order subfields" (n=2) mentioned in this invention. The subfields (SF3, SF8, . . . , SF32) with a weight of "4" correspond to the "medium subfields" (n=2) mentioned in this invention. The subfields (SF4, SF5, . . . , SF37) with a weight of "8" correspond to the "high-order subfields (n=2, m=1) mentioned in this invention.

In the following, the process of selecting the appropriate subfield to be turned on (to be lit up) corresponding to the tone to be displayed will be explained.

Since, in the operation concerned with the six high-order bits, the third bit is almost the same for Gs1–Gs6, only Gs1 will be explained. The tones that can be displayed by Gs1 are 0–39. The subfields used for displaying the six high-order bits are SF3 with a weight of "4" and SF4–SF7 with a weight of "8". The lowest bit among the six high-order bits, that is, the third bit, corresponds to SF 3. Each time that the value of the fourth bit is changed, that is, each time that the five high-order bits have a carry of one, the number of lit subfields is increased consecutively one at a time in the sequence from SF4 to SF7. When the tone to be displayed is larger than 39, SF3–SF7 of Gs1 are turned on constantly. When the tone to be displayed is in the range of 40–84, Gs2 is operated in the same manner. As the tone to be displayed rises, the lighting operation is performed sequentially in the same manner for Gs3–Gs6. In this case, SF1–SF3 repeats sequential on/off switching.

Figure 2:
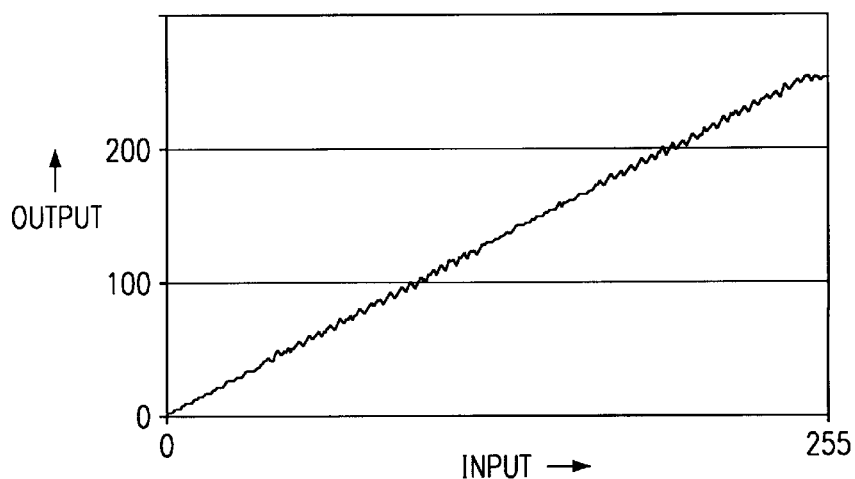
FIG. 2 is a diagram illustrating the simulation result of an image observed when moving a lamp waveform using the tone display method disclosed in the first embodiment of this invention.

FIG. 2 shows a computer-simulated image observed when a moving lamp waveform is displayed using the tone display method disclosed in the present embodiment. The simulation method is identical to the method used for the simulation for the conventional example shown in FIG. 11. In this simulation, the time integral level of the eyes is calculated when the vision spot moves to the right at a speed of eight pixels during the display period of each field.

Figure 11:
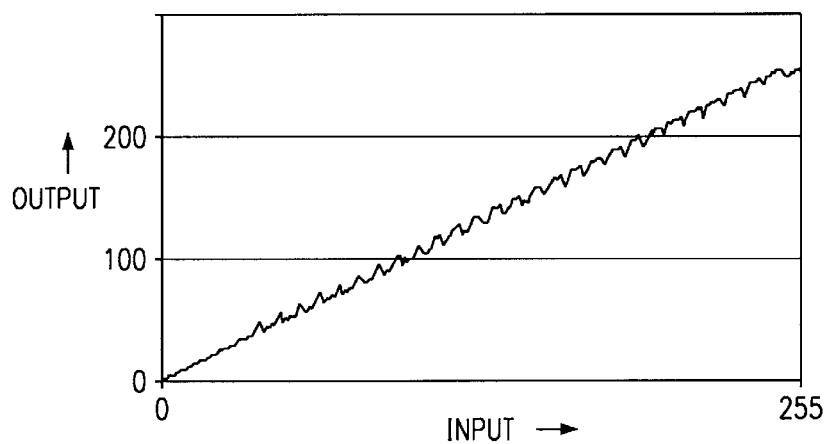
FIG. 11 is a diagram illustrating the simulation result of an image observed when moving a lamp waveform using the conventional tone display method.
Figure 12:
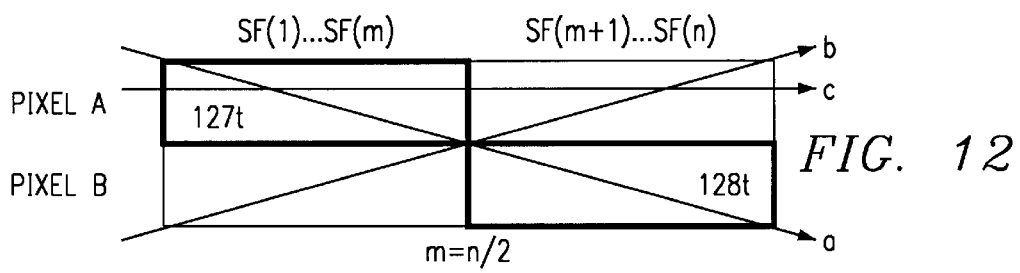
FIG. 12 is a diagram illustrating movement of a vision spot among pixels when the conventional tone display method is used.

The simulation results obtained by the conventional method show that the waveform illustrated in FIG. 11 has relatively strong noise at the positions where the tone is a multiple of 8, that is, at the positions where the subfields with a weight of 8 are freshly lit up.

More specifically, relatively strong noise corresponding to eight levels occurs near the positions where the tone to be displayed changes from 8×n−1 to 8×n (n is an integer in the range of 1–31). The reason for the aforementioned noise has been explained above.

The waveform illustrated in FIG. 2 shows the simulation results obtained using the tone display method disclosed in the present embodiment. Noise mainly occurs at the positions where the subfields with a weight of 4 are freshly lit up. More specifically, noise occurs near the positions where the tone to be displayed changes from 4×n−1 to 4×n (n is an integer in the range of 1–63). However, the scale of the noise is only four levels, which is smaller than the noise of eight levels in the conventional example. This is because the on/off switching of the subfields across the segments is performed corresponding to a relatively small weight of "4".

Figure 10:
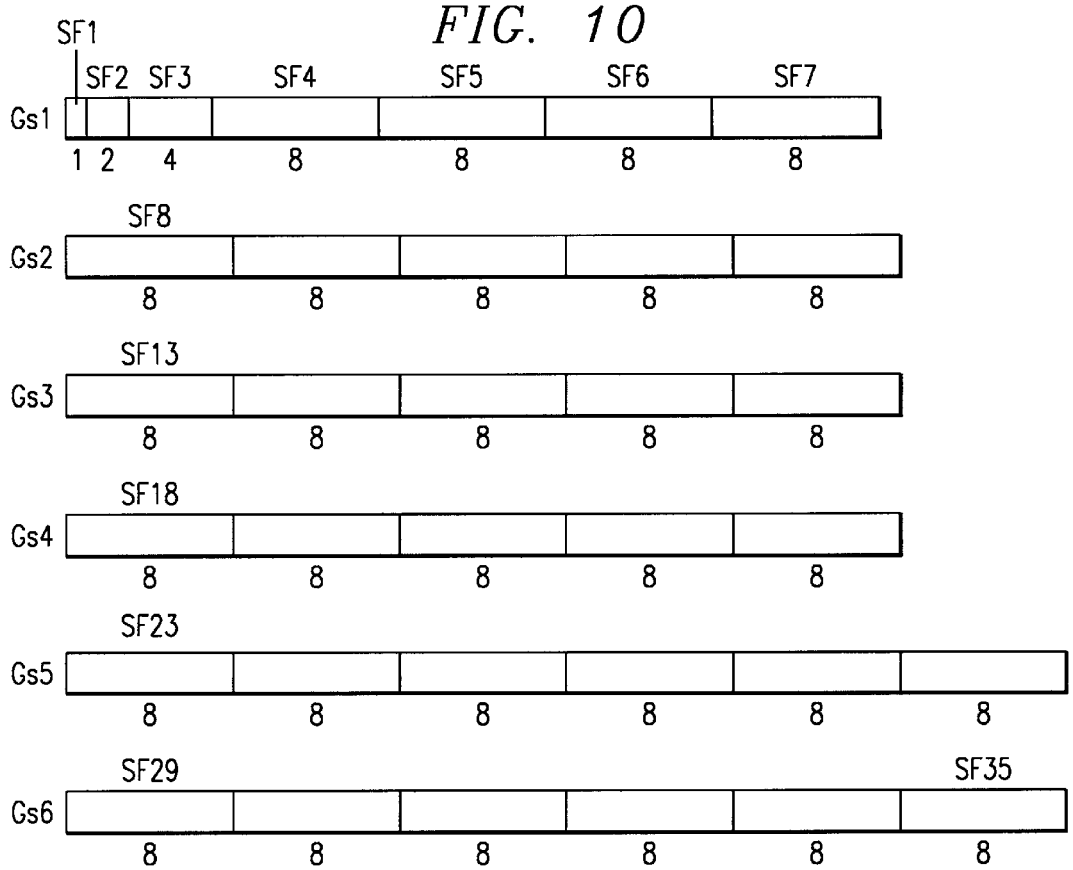
FIG. 10 is a diagram illustrating the subfield configuration used in the conventional tone display method.

Using the tone display method disclosed in the present embodiment, when the tone to be displayed is changed, the degree of change in the weight of the subfields in each segment is reduced, and the degree of change in position and quantity during the lighting period is reduced. In this way, the pseudocontour of the dynamic image can be reduced, and the image quality can be improved. Also, in the tone display method disclosed in the present embodiment, the number of subfields for each color in one field is 37, which is slightly larger than 35, the number of the subfields used in the conventional tone display method shown in FIG. 10. Consequently, an increase in the cost can be avoided.

In the present embodiment, the tone display method disclosed is explained based on the assumption that n=2 and the degree of change in the weight of the subfields in each segment is "4" and on the assumption that n=2, m=1 and that the weights of all of the "high-order subfields" in each segment are "8". This embodiment, however, is not limited to these examples. With m and n set as prescribed natural numbers, this invention can provide a tone display method that is able to display dynamic images with a much higher image quality than the conventional tone display method using a similar number of subfields for each color in one field. Compared with a tone display method that can display dynamic images with an image quality similar to that realized by this invention, the number of subfields for each color in one field used by the tone display method of this invention can be significantly reduced. Therefore, the cost can be cut significantly.

In accordance with the second embodiment of the invention, the tone display method disclosed is used to display 8-bit images with 256 tones.

Figure 3:
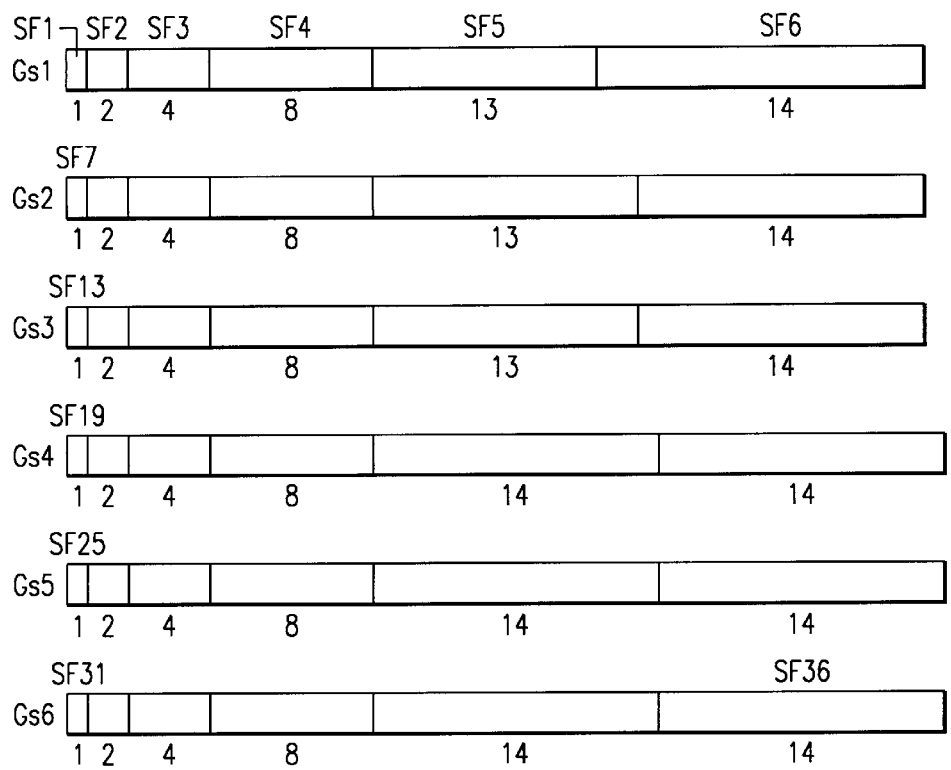
FIG. 3 is a diagram illustrating the subfield configuration adopted in the tone display method disclosed in the second embodiment of this invention.

FIG. 3 is a diagram illustrating the subfield configuration adopted in the tone display method disclosed in the second embodiment. Although the subfield configuration shown in the figure is for the color G, it is also applicable to R and B. In the present embodiment, the image display device used for realizing the tone display method is identical to the conventional example shown in FIG. 7. The configuration of the color wheel is identical to the conventional example shown in FIG. 8. The arrangement of the segments in one field is identical to the conventional example shown in FIG. 9.

In the present embodiment, one field is divided into 36 subfields for one color. Among the eight bits corresponding to the 256 tones, the four high-order bits since the fifth bit are displayed using the subfields having weights of "13" and "14". The four low-order bits are displayed on the binary base using the subfields whose weights are "1", "2", "4" and "8", respectively. The subfields used for displaying the four high-order bits and the subfields used for displaying the four low-order bits are arranged in each segment. In the present embodiment, "weight" is also measured in the time length of each subfield as described in the first embodiment. The subfields with weights of"1" and "2" (SF1, SF2, SF7, SF8, . . . , SF31, SF32) correspond to the "low-order subfields" (n=2) mentioned in this invention. The subfields with a weight of 4 (SF3, SF9, . . . , SF33) correspond to the "medium subfields" (n=2) mentioned in this invention. The subfields with weights of "8", "13" and "14" (SF4, SF5, SF6, . . . , SF34, SF35, SF36) correspond to the "high-order subfields" (n=2, m=1) mentioned in this invention.

The subfield configuration used in the present embodiment is different from that used in the first embodiment in the sense that when consecutive tones are displayed, the on/off switching of the subfields across the segments is performed corresponding to 1, which is the minimum weight of a subfield. In other words, if the tone rising consecutively cannot be displayed using the subfields of Gs1, the subfields of Gs2 are used for display in addition to Gs1, and Gs3–Gs6 can be sequentially applied in the same way. In this case, once all of the subfields in a segment are turned on, they will not be turned off again.

FIG. 4 shows tables indicating which subfields should be turned on (lit up) for a tone to be displayed. Since Gs1, Gs2 and Gs3 as well as Gs4, Gs5 and Gs6 have the same subfield configurations, respectively, only the cases of Gs1 and Gs4 are shown in FIGS. 4(a) and 4(b), respectively. In FIG. 4, the on and off states are represented by 1 and 0, respectively.

When the simulation explained in FIG. 11 is performed as described above, relatively strong noise equivalent to eight levels occurs in the conventional method. In the tone display method disclosed in this embodiment, however, the step in each segment becomes 1 when the tone to be displayed rises consecutively. As a result, when the simulation explained with reference to FIG. 11 is performed, the scale of the generated noise is equivalent to 1, which is much lower than the noise of eight levels in the conventional example and is also lower than the noise of four levels in the first embodiment.

Using the tone display method disclosed in the present embodiment, when the tone to be displayed is changed, the degree of change in the weight of the subfields in each segment is reduced, and the degree of change in position and quantity during the lighting period is reduced. In this way, the pseudocontour of the dynamic image can be reduced and the image quality can be improved. Also, in the tone display method disclosed in the present embodiment, the number of subfields for each color in one field is 36, which is slightly larger than 35, the number of subfields used in the conventional tone display method shown in FIG. 10. Consequently, an increase in the cost can be avoided.

In the present embodiment, the tone display method is explained based on the assumption that n=2 and the degree of change in the weight of the subfields in each segment is "1" and based on the assumption that n=2, m=1 and the weight of one of the "high-order subfields" in each segment is "8", while the weights of the rest of the subfields are "13" and "14". This embodiment, however, is not limited to these examples. Even if m and n are assigned with different natural numbers, and/or the weights of the "high-order subfields" have a different combination, as long as the subfields in each segment are configured appropriately so that every possible weight, which is a multiple of $2^n$ and smaller than the total weight of the segment concerned, can be displayed by the combination of weights of the subfields in the segment, this invention can provide a tone display method that is able to display dynamic images with a much higher image quality than the conventional tone display method using a similar number of subfields for each color in one field. Compared with a tone display method that can display dynamic images with an image quality similar to that realized by this invention, the number of subfields for each color in one field used by the tone display method of this invention can be significantly reduced. Therefore, the cost can be cut significantly.

The subfield configuration shown in FIG. 3 can be changed by only keeping SF1 and SF2 while omitting other subfields with weights of "1" and "2" (SF7, SF8, . . . , SF31, SF32). As a result, in the tone display method, with the degree of change in the weight of the subfields in each segment becomes "4" for n=2, the maximum noise level becomes "4", which is the same as that in the first embodiment. The number of subfields for each color in one field becomes 26.

Similarly, when the subfield configuration shown in FIG. 3 is changed by only keeping SF1 while omitting other subfields with a weight of "1" (SF7, . . . , SF31), in the tone display method, the degree of change in the weight of the subfields in each segment becomes "2" for n=1. The maximum noise level becomes "2" which is smaller than that in the first embodiment. The number of subfields for each color in one field becomes 31.

In accordance with the third embodiment of this invention, the tone display method disclosed in the present embodiment is used to display 8-bit images with 256 tones.

Figure 5:
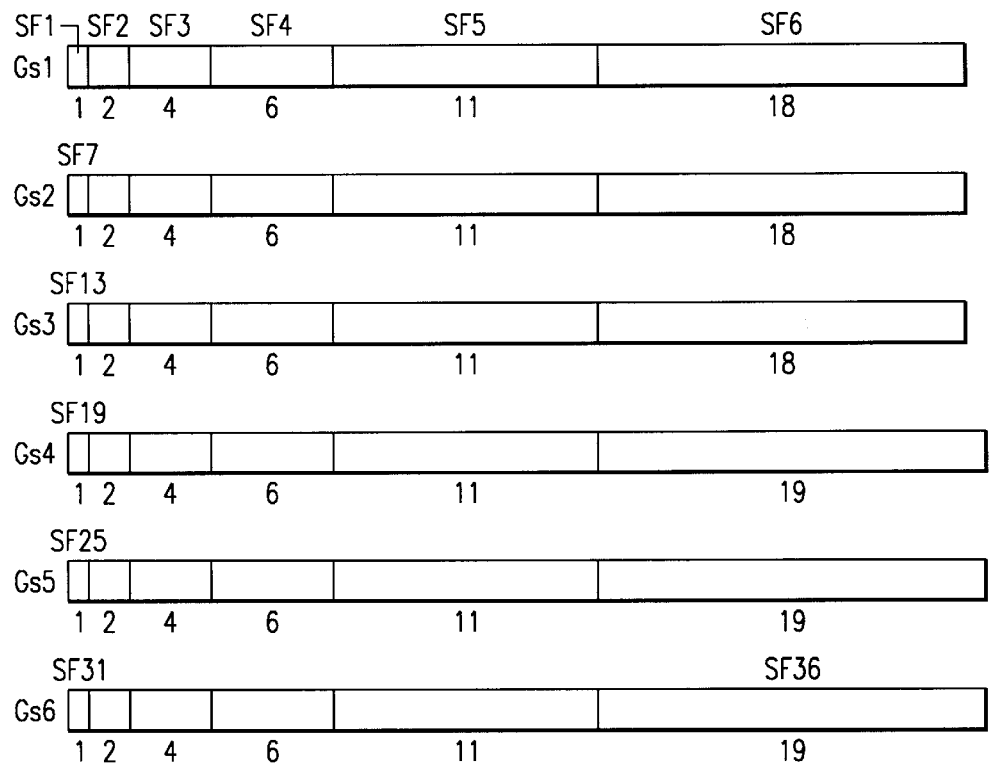
FIG. 5 is a diagram illustrating the subfield configuration adopted in the tone display method disclosed in the third embodiment of this invention.

FIG. 5 is a diagram illustrating the subfield configuration adopted in the tone display method disclosed in the third embodiment. Although the subfield configuration shown in the figure is for the color G, it is also applicable to R and B. In the present embodiment, the image display device used for realizing the tone display method is identical to the conventional example shown in FIG. 7. The configuration of the color wheel is identical to the conventional example shown in FIG. 8. The arrangement of the segments in one field is identical to the conventional example shown in FIG. 9.

In the present embodiment, one field is divided into 36 subfields for one color. Among the 8 bits corresponding to the 256 tones, the 5 high-order bits since the fourth bit are displayed using the subfields with weights "6", "11" and "18", which are not binary numbers. The three low-order bits are displayed on the binary base using the subfields whose weights are "1", "2" and "4", respectively. The subfields used for displaying the five high-order bits and the subfields used for displaying the three low-order bits are arranged in each segment. In the present embodiment, "weight" is also measured in the time length of each subfield as described in the first embodiment. The subfields with weights of "1" and "2" (SF1, SF2, SF7, SF8, . . . , SF31, SF32) correspond to the "low-order subfields" (n=2) mentioned in this invention. The subfields with a weight of "4" (SF3, SF9, . . . , SF33) correspond to the "medium subfields" (n=2) mentioned in this invention. The subfields with weights of "6", "11" and "19" (SF4, SF5, SF6, . . . , SF34, SF35, SF36) correspond to the "high-order subfields" (n=2, m=1) mentioned in this invention.

The subfield configuration used in the present embodiment is identical to that used in the second embodiment. When consecutive tones are displayed, the on/off switching of the subfields across the segments is performed corresponding to 1, which is the minimum weight of subfield. In other words, if the tone rising consecutively cannot be displayed using the subfields of Gs1, the subfields of Gs2 are used for display in addition to Gs1, and Gs–Gs6 can be sequentially ordered in the same way. In this case, once all of the subfields in a segment are turned on, they will not be turned off again.

FIG. 6 shows tables indicating which subfields should be turned on (lit up) for at tone to be displayed. Since Gs1, Gs2 and Gs3 as well as Gs4, Gs5 and Gs6 have the same subfield configurations, respectively, only the cases of Gs1 and Gs4 are shown in FIGS. 6(a) and 6(b), respectively. In FIG. 6, the on and off states are represented by 1 and 0, respectively.

When the simulation explained in FIG. 11 is performed as described above, relatively strong noise equivalent to eight levels occurs in the conventional method. In the tone display method disclosed in this embodiment, however, the step in each segment becomes 1when the tone to be displayed rises consecutively. As a result, when the simulation explained in FIG. 11 is performed, the scale of the generated noise is equivalent to 1, which is much lower than the noise of eight levels in the conventional example and is also lower than the noise of four levels in the first embodiment.

Using the tone display method disclosed in the present embodiment, when the tone to be displayed is changed, the degree of change in the weight of the subfields in each segment is reduced, and the degree of change in position and quantity during the lighting period is reduced. In this way, the pseudocontour of the dynamic image can be reduced and the image quality can be improved. Also, in the tone display method disclosed in the present embodiment, the number of subfields for each color in one field is 36, which is slightly larger than 35, the number of the subfields used in the conventional tone display method shown in FIG. 10. Consequently, an increase in the cost can be avoided.

In the present embodiment, the tone display method is explained based on the assumption that n=2 and the degree of change in the weight of the subfields in each segment is "1". The tone display method disclosed in claim 8 is explained based on the assumption that the weights of the "high-order subfields" are "6", "11" and "19". This embodiment, however, is not limited to these examples. Even if n is assigned with a different natural number, and/or the weights of the "high-order subfields" have a different combination, as long as the subfields in each segment are appropriately configured so that every possible weight that is a multiple of $2^n$ and smaller than the total weight of the segment concerned can be displayed by the combination of the weights of the subfields in the segment, this invention can provide a tone display method that is able to display dynamic images with a much higher image quality than the conventional tone display method using a similar number of subfields for each color in one field. Compared with a tone display method that can display dynamic images with an image quality similar to that realized by this invention, the number of subfields for each color in one field used by the tone display method of this invention can be significantly reduced. Therefore, the cost can be significantly cut.

The subfield configuration shown in FIG. 5 can be changed by only keeping SF1 and SF2 while omitting other subfields with weights of "1" and "2" (SF7, SF8, . . . , SF31, SF32). As a result, in the tone display method, the degree of change in the weight of the subfields in each segment becomes "4" for n=22. The maximum noise level becomes "4", which is the same as that in the first embodiment. The number of subfields for each color in one field becomes 26.

Similarly, when the subfield configuration shown in FIG. 5 is changed by only keeping SF1 while omitting other subfields with a weight of "1" (SF7, . . . , SF31), in the tone display method, the degree of change in the weight of the subfields in each segment becomes "2" for n=1. The maximum noise level becomes "'2", which is smaller than that in the first embodiment. The number of subfields for each color in one field becomes 31.

In the first to third embodiments, the number of tones provided by way of example is 256 for red, green and blue. However, the tone display method of this invention is also applicable to other colors and other numbers of tones. Also, the number of segments for each color in a field is 6 by way of example. However, it is also possible to divide one field into a different number of segments corresponding to the division and rotating speed of the color filter. As described above, with one unit defined as the time obtained by dividing the time, corresponding to a prescribed color in one field, by the number of tones, each subfield in this invention has a time length corresponding to the brightness of the aforementioned one prescribed color obtained when only the subfield concerned is turned on. This weighting method, however, is not exclusive. Even if each subfield is weighted in a different way, the desired brightness can still be obtained when only the subfield concerned is turned on. In brief, according to this invention, the time band corresponding to a prescribed color in one frame/field is constituted with multiple time division bands. A time segment corresponding to each of the aforementioned time division bands is set. Each of the aforementioned segments is constituted with multiple subfields. The tone of the aforementioned one prescribed color is displayed by appropriately setting the on/off state of each subfield of the aforementioned one prescribed color. Each of the aforementioned subfields has a weight corresponding to the brightness of the aforementioned one prescribed color obtained when only the subfield concerned is turned on, with one unit defined as the result obtained by dividing the brightness, obtained when all of the aforementioned subfields corresponding to the aforementioned one prescribed color in the aforementioned one frame/field are turned on, by the number of tones. Some of the aforementioned subfields are low-order subfields whose weights are smaller than a weight corresponding to a prescribed tonal width. At least one of the aforementioned segments has the aforementioned low-order subfields. Each of the aforementioned segments has at least one medium subfield, which is a subfield other than the aforementioned low-order subfields with a weight corresponding to the aforementioned tonal width, and at least one high-order subfield other than the aforementioned low-order subfields with a weight larger than the weight corresponding to the aforementioned prescribed tonal width. The subfields of each segment should be configured appropriately so that every possible weight, which is a multiple of the weight of the aforementioned medium subfield and is smaller than the total weight of the segment concerned, can be realized by the combination of the weights of the aforementioned subfields. When the tone display is consecutively switched, the on/off switching of the aforementioned subfields is performed in the sequence of low-order subfield, medium subfield and high-order subfield. The on/off switching of the aforementioned low-order subfields is sequentially performed with the subfield having a smaller weight switched first As far as on/off switching of the aforementioned high-order subfields is concerned, the on/off switching of the high-order subfields in the same segment is performed first. When the on/off switching of the subfields in the same segment is not sufficient, the subfields in another segment are selected according to the timing arrangement of the aforementioned segment, followed by on/off switching of the selected subfields.

As explained above, this invention provides a tone display method using subfields that can prevent image quality deterioration of the dynamic image and can avoid a cost increase.

Using the tone display method of this invention, the degree of change in position and quantity occurring during the lighting time accompanied by the changes in the subfields in each segment is reduced. In this way, the sensed error level can be reduced and the image quality can be improved by reducing the pseudocontour of the dynamic image.

What is claimed is:

1. A tone display method comprising the steps of:

providing a time band corresponding to a prescribed color in one frame/field formed with multiple time-division time bands;

setting a timing segment corresponding to each of said time-division time bands, each of said timing segments having multiple subfields;

displaying the tone of said one prescribed color by appropriately turning on/off each of said subfields of said one prescribed color, each of said subfields having a weight corresponding to the brightness of said one prescribed color obtained when only the subfield concerned is turned on, with one unit defined as the result obtained by dividing the brightness, obtained when all of the aforementioned subfields corresponding to said one prescribed color in said one frame-field are turned on, by the number of tones, some of said subfields being low-order subfields having weights less than a weight corresponding to a prescribed tonal width, at least one of said segments having the aforementioned low-order subfields, each of said segments having at least one medium subfield that is a subfield other than said low-order subfields and having a weight corresponding to the aforementioned tonal width, each of said segments also having at least one high-order subfield that is a subfield other than said low-order subfields and having a weight greater than the weight corresponding to said prescribed tonal width;

configuring the subfields of each segment so that every possible weight, which is a multiple of the weight of said medium subfield and is less than the total weight of the segment concerned, can be realized by the combination of the weights of said subfields;

on/off switching said subfields in the sequence of low-order subfield, medium subfield, and high-order subfield, the on/off switching of said low-order subfields being performed sequentially with the subfield having a lesser weight switched first;

on-off switching of said high-order subfields in the same segment first; and when said on/off switching of said subfields in the same segment is not sufficient, selecting the subfields in another segment according to the timing arrangement of said segment, followed by on/off switching of the selected subfields.

2. The tone display method according to claim 1 wherein when 256 tones are displayed, said prescribed tonal width being defined as four tones.

3. The tone display method of claim 1 wherein one segment has said low-order subfields.

4. The tone display method of claim 2 wherein one segment has said low-order subfields.

5. The tone display method of claim 1 wherein all of said segments have the same configuration of said low-order subfields.

6. The tone display method of claim 2 wherein all of said segments have the same configuration of said low-order subfields.

7. The tone display method of claim 1 wherein each of the segments having low-order subfields has n low-order subfields where n is a prescribed natural number;

each of said n low-order subfields has a weight that is $2^0$, $2^1$, ... or $2^{n-1}$ times said unit; and said medium subfield has a weight that is $2^n$ times said unit.

8. The tone display method of claim 6 wherein each of the segments having low-order subfields has n low-order subfields where n is a prescribed natural number;

each of said n low-order subfields has a weight that is $2^0$, $2^1$, ... or $2^{n-1}$ times said unit; and said medium subfield has a weight that is $2^2$ times said unit.

9. The tone display method described in claim 7, wherein each of at least some of the high-order subfields in each of said segments has a weight that is $2^{n+1}$, $2^{n+2}$, ... $2^{2n+m}$ times said unit, where m is a prescribed natural number, the rest of the high-order subfields in each of said segments having weights that are more than $2^{n+m}$ times said unit.

10. The tone display method described in claim 8, wherein each of at least some of the high-order subfields in each of said segments has a weight that is $2^{n+1}$, $2^{n+2}$, ... $2^{n+m}$ times said unit, where m is a prescribed natural number, the rest of the high-order subfields in each of said segments having weights that are more than $2^{n+m}$ times said unit.

11. The tone display method described in claim 9 wherein the time length difference among the rest of the high-order subfields in each of said segments is 0 or 1.

12. The tone display method described in claim 10 wherein the time length difference among the rest of the high-order subfields in each of said segments is 0 or 1.

13. The tone display method described in claim 7 wherein each of said segments has two or more high-order subfields, said two or more high-order subfields having different weights.

14. The tone display method described in claim 8 wherein each of said segments has two or more high-order subfields, said two or more high-order subfields having different weights.

15. The tone display method described in claim 1 wherein the weight difference among all of the segments or the weight difference among all of the segments having no low-order subfield is 0 or 1 times said unit.

16. The tone display method described in claim 14 wherein the weight difference among all of the segments or the weight difference among all of the segments having no low-order subfield is 0 or 1 times said unit.

17. The tone display method described in claim 1 wherein the weight is the time length, with one unit defined as the time obtained by dividing the time corresponding to said one prescribed color, in said one frame/field, by the number of tones.

18. The tone display method described in claim 16 wherein the weight is the time length, with one unit defined as the time obtained by dividing the time corresponding to said one prescribed color, in said one frame/field, by the number of tones.

* * * * *